(12) United States Patent
Holmes et al.

(10) Patent No.: US 8,027,042 B2
(45) Date of Patent: Sep. 27, 2011

(54) MULTIPLE BEAM SOURCE FOR A MULTI-BEAM INTERFEROMETER AND MULTI-BEAM INTERFEROMETER

(75) Inventors: Jon Denis Holmes, Kent (GB); Simon Richard Hattersley, Kent (GB); Andrew Gilkes, Kent (GB)

(73) Assignee: Michelson Diagnostics Limited, Maidstone (GB)

( * ) Notice: Subject to any disclaimer, the term of this patent is extended or adjusted under 35 U.S.C. 154(b) by 38 days.

(21) Appl. No.: 12/517,794

(22) PCT Filed: Dec. 6, 2007

(86) PCT No.: PCT/GB2007/004681
§ 371 (c)(1),
(2), (4) Date: Jun. 4, 2009

(87) PCT Pub. No.: WO2008/068497
PCT Pub. Date: Jun. 12, 2008

(65) Prior Publication Data
US 2010/0053636 A1 Mar. 4, 2010

(30) Foreign Application Priority Data
Dec. 6, 2006 (GB) .................................. 0624361.2

(51) Int. Cl.
*G01B 11/02* (2006.01)
*G01B 9/02* (2006.01)
(52) U.S. Cl. ........................................ 356/519; 356/497
(58) Field of Classification Search .................. 356/480, 356/519, 454, 479, 497
See application file for complete search history.

(56) References Cited

U.S. PATENT DOCUMENTS

| | | | | |
|---|---|---|---|---|
| 5,134,276 A | 7/1992 | Hobbs | .................. | 250/208.2 |
| 6,028,706 A | 2/2000 | Shirasaki et al. | | |
| 6,396,856 B1 * | 5/2002 | Sucha et al. | ................... | 372/25 |
| 7,002,696 B1 * | 2/2006 | Miron | ............................ | 356/519 |
| 7,580,432 B2 * | 8/2009 | Sucha et al. | ................... | 372/30 |
| 7,859,682 B2 * | 12/2010 | Smith et al. | ................... | 356/497 |
| 2002/0097761 A1 * | 7/2002 | Sucha et al. | ................... | 372/30 |
| 2003/0030908 A1 | 2/2003 | Cheng et al. | | |
| 2009/0296749 A1 * | 12/2009 | Sucha et al. | ....................... | 372/6 |
| 2010/0053636 A1 * | 3/2010 | Holmes et al. | ................. | 356/519 |

FOREIGN PATENT DOCUMENTS

| | | | |
|---|---|---|---|
| WO | 0203123 A2 | | 1/2002 |
| WO | 02052306 A2 | | 7/2002 |
| WO | WO 02/052306 | * | 7/2002 |
| WO | 03009032 A1 | | 1/2003 |
| WO | 2006054116 A2 | | 5/2006 |

OTHER PUBLICATIONS

LLE Review, Quarterly Report, vol. 79, Laboratory for Laser Energetics, Univ. of Rochester, DOE/SF/19460-317, pp. 1 and 150, Apr.-Jun. 1999, URL= http://www.lle.rochester.edu/pub/review/v79/79.pdf, download date Jun. 3, 2009.

* cited by examiner

*Primary Examiner* — Patrick J Connolly
(74) *Attorney, Agent, or Firm* — Seed IP Law Group PLLC

(57) ABSTRACT

A multi-beam interferometer, typically for use in Optical Coherence Tomography, comprising a multiple beam source, the source being arranged so as to provide, in use, a plurality of beams of light for use in the interferometer, the source comprising: a light source arranged to, in use, emit a beam of light; and a rattle plate comprising a first reflective surface and a second reflective surface facing one another, the second reflective surface being only partially reflective.

20 Claims, 2 Drawing Sheets

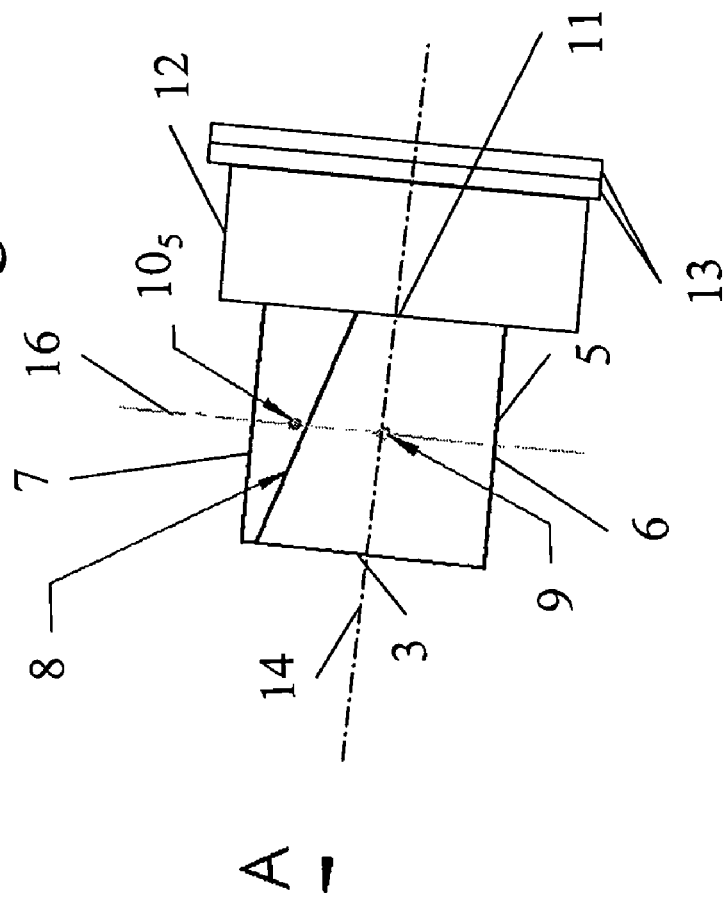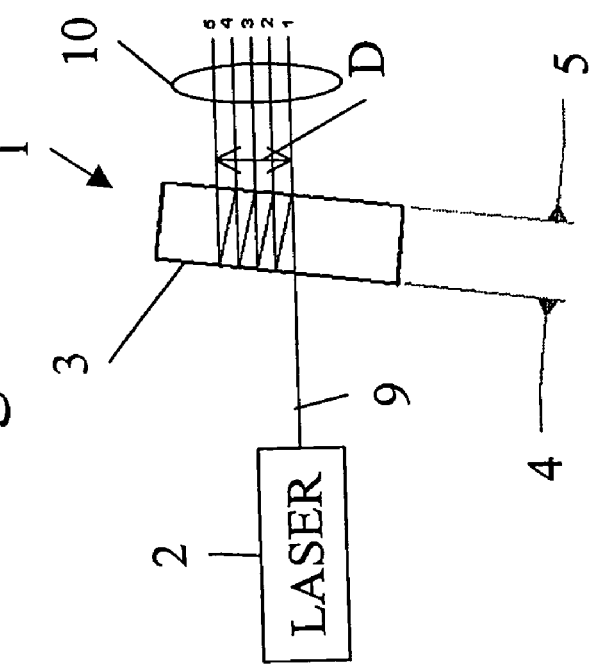

MULTIPLE BEAM SOURCE FOR A MULTI-BEAM INTERFEROMETER AND MULTI-BEAM INTERFEROMETER

BACKGROUND

1. Technical Field

This disclosure relates to a multiple beam source for a multi-beam interferometer and to a multi-beam interferometer itself, typically but not exclusively for use in Optical Coherence Tomography.

2. Description of the Related Art

Internal medical examinations are typically carried out using an endoscope in which the eye or a CCD (charge coupled device) camera images the view relayed from the distal end of a shaft of a probe, thereby viewing the surface of the tissue adjacent to the probe end. It is often desirable to obtain a cross-sectional image from within the tissue, rather than just the surface. Optical Coherence Tomography (OCT) has been proposed as a technique that can provide such a capability.

OCT is based on the use of interferometry, where light in the measurement arm of an interferometer is passed to the object to be examined and a portion is scattered back to the interferometer. Light in the reference arm is passed to a mirror at a known distance and a reference beam is reflected back. The scattered measurement beam and the reflected reference beam are combined and the interference between the two beams is detected and used to provide data about the examined object.

Thus, optical coherence tomography uses interferometry and the coherence properties of light to obtain depth-resolved images within a scattering medium, providing penetration and resolution which cannot be achieved using confocal microscopy alone. Clinically useful cross-sectional images of the retina and epithelial tissues have been obtained to a depth of 2-3 mm.

At any given time, a single beam of light is restricted to being in sharp focus only over a certain range—the so-called depth of focus or Rayleigh range. In the PCT patent application published as WO2006/054116, it has been proposed to transmit multiple beams with different focal depths so as to spread this range out and to produce depth scans with an increased depth of field.

Where the light for the multiple beams is provided from a common source, as is most convenient, such as a laser, then optical means such as an amplitude beam splitter may be provided to generate a plurality of beams. In WO2006/054116, a "rattle plate" is disclosed, which comprises a parallel-sided glass plate positioned at a slight angle to the perpendicular relative to the incoming light beam.

Referring to the two major faces of the plate as the "entry" face and the "exit" face, the exit face is completely covered with a partially reflective coating, whereas the majority of the entry face, save for the area in which the incoming beam is incident, is covered in a high efficiency reflective coating. Accordingly, the incident beam passes into the rattle plate through the entry face and then alternately bounces off the reflective coverings on the exit and entry faces. Each reflection off the partially reflective covering on the exit face allows a fraction of the light beam to escape, thereby generating discrete beams of gradually reducing power. An opaque plate is provided to block those beams over the number required.

BRIEF SUMMARY

According to a first aspect of the disclosure, there is provided a multiple beam source for a multi-beam interferometer, the source being arranged so as to provide, in use, a plurality of beams of light for use in the interferometer, the source comprising:

a light source arranged to, in use, emit a beam of light; and a rattle plate comprising a first reflective surface and a second reflective surface facing one another, the second reflective surface being only partially reflective;

in which the light source and the rattle plate are positioned relative to one another such that, in use, the beam of light is incident on the rattle plate such that the beam of light is repeatedly reflected along a beam path between the first and second reflective surfaces, each successive and spaced-apart reflection off the partially reflective second reflective surface causing a portion of the light beam to be transmitted through the second reflective surface to form one of the beams of the plurality of beams;

and in which between at least one successive pair of beams of the plurality of beams there is a decrease along the beam path in the level of reflectance due to the second reflective surface.

By reducing the level of reflectance due to the second reflective surface as the light beam passes through the rattle plate, the amount of power transmitted through the rattle plate, and typically lost after the terminal beam, can be reduced. Therefore, the efficiency of the rattle plate is increased. Accordingly, for the same input power a higher average output beam power can be achieved. Furthermore, the change in reflectance allows the relative powers of the beams to be shaped as desired; the power of the later beams can be boosted relative to the initial beams.

In one embodiment, the plurality of beams include a terminal beam, being the last of the plurality of beams to be emitted from the incident light beam as the incident light beam travels through the rattle plate, in which one of the at least one successive pair of beams comprises the terminal beam. It is particularly advantageous to increase the ratio of power transmitted at the terminal beam rather than reflected as the internal beam of light, as any reflected light at this stage will simply be wasted.

Indeed, the terminal beam may be subject to substantially no reflection at the second reflective surface. The second reflective surface may be shaped and positioned such that, in use, the terminal beam is emitted from the rattle plate avoiding the second reflective surface. By making sure that there is no, or little, reflection of the terminal beam back into the rattle plate, as little energy as possible is wasted.

Whilst it is possible that the two reflective surfaces could be separated by air, in one convenient embodiment the rattle plate comprises a transparent block on which the first and second reflective surfaces are mounted, typically on input and output faces thereof respectively. Typically, such faces are parallel. This facilitates mounting the reflective surfaces correctly relative to one another.

The second reflective surface may cover only a portion of the output face of the transparent block; the block may be provided with an uncovered area of the second face of the block that is not covered with the second reflective surface, which may, in use, provide an exit from the rattle plate for the terminal beam. Accordingly, by simply omitting the second reflective surface from the uncovered area of the transparent block the improvement in efficiency can be achieved. Furthermore, this allows the terminal beam to be boosted in power relative to the other beams over what it would be if the reflectance of the second reflective surface were consistent along the beam path.

The first and second reflective surfaces may comprise reflective coatings on the block. The uncovered area of the second face of the block may comprise or consist of an uncoated area of the output face of the block.

Furthermore, the first reflective surface may be omitted from the block in the area in which, in use, the input light beam is incident.

The transparent block may be typically mounted relative to the light source by means of a mounting attached to a side of the transparent block. The mounting may be such that the position of the rattle plate can be adjusted relative to the light source so that, in use, the incident beam of light is incident on the rattle plate so that the plurality of beams consists of a desired number of beams. Indeed, the mounting may be arranged so that, as it is adjusted, a transition between the second reflective surface and the uncovered area is moved relative to the plurality of beams. In some embodiments, where the plurality of beams lies, in use, in a plane (such as would be the case with parallel reflective surfaces), the transition is positioned at a non-perpendicular, non-parallel angle to the plane of the beams in use.

By doing so, the position of the rattle plate may be able to be adjusted so that the input beam of light is positioned, in use, so that the desired number of output beams hit the second reflective coating, with the terminal beam being incident on the uncovered area. Typically, the angle is about 18 degrees, although this can vary widely. This angle can be chosen to give the desired sensitivity of adjustment relative to adjustment of the mounting.

The mounting may be arranged such that the adjustment can be achieved by the insertion of spacers into the mounting, so as to move the rattle plate along an axis. This is a particularly simple way of achieving the adjustment. Other mountings could be envisaged, such a screw drive or similar.

In one embodiment, a multi-beam interferometer, typically for use in Optical Coherence Tomography, comprises a multiple beam source (1), the source being arranged so as to provide, in use, a plurality of beams ($10_1$-$10_5$) of light for use in the interferometer, the source comprising: a light source (2) arranged to, in use, emit a beam of light (9); and a rattle plate (3) comprising a first reflective surface (4) and a second reflective surface (5) facing one another, the second reflective surface (5) being only partially reflective; in which the light source (2) and the rattle plate (3) are positioned relative to one another such that, in use, the beam of light (9) is incident on the rattle plate (3) such that the beam of light is repeatedly reflected along a beam path between the first and second reflective surfaces (4,5), each successive and spaced-apart reflection off the partially reflective second reflective surface causing a portion of the light beam (9) to be transmitted through the second reflective surface (5) to form one of the beams of the plurality of beams ($10_1$-$10_5$); and in which between at least one successive pair of beams ($10_4$, $10_5$) of the plurality of beams there is a decrease along the beam path in the level of reflectance due to the second reflective surface (5). In an embodiment, the interferometer comprises a balance beam channel, comprising an optical path for a balance beam ($10_5$) and a detector (23) for the intensity of the balance beam in which, in use, the detected intensity of the balance beam is used to correct for laser amplitude variation, in which the balance beam has an intensity as high or higher than any other of the plurality of beams ($10_1$-$10_4$).

According to a second aspect of the disclosure, there is provided a multi-beam interferometer comprising a multi-beam source according to the first aspect of the disclosure. Typically, the multi-beam interferometer will also comprise a beam splitter, a reference path for the plurality of beams, a measurement path for the plurality of beams and means for comparing the plurality of beams as transmitted over the reference and measurement paths.

In high gain interferometry, where the reference beam power is much greater than the measurement beam power, the dominant noise source is generally the laser, specifically wide-band laser amplitude variation. The laser noise is mainly seen as an additive term in the interferometer output signal, so by subtracting a balance signal containing an equal amplitude of the same noise, the system signal-to-noise ratio can be improved.

It is known from WO2006/054116 to use the weakest beam of a set of beams split from the same source to provide a balance channel, separate from the reference and measurement paths to give an indication of this noise. In some embodiment, it may be desirable that the light power in the balance beam be as high as or higher than the light power in each of the interferometer channels.

This may be conveniently achieved by the interferometer comprising a balance path, comprising an optical path for a balance beam being one of the plurality of beams and a detector for the intensity of the balance beam in which, in use, the detected intensity of the balance beam is used to correct for laser amplitude variation, in which the balance beam is the terminal beam, and where the reflectance of the second reflective coating and the number of beams in the plurality of beams is such that the balance beam, in use, has an intensity as high or higher than the remaining beams of the plurality of beams. The optical path for the balance beam may conveniently comprise the reference path.

The intensity of the balance beam, in use, may be higher than the remaining beams of the plurality of beams. For example, it may be 1%, 5%, 10% or 25% higher than the most intense remaining beam.

Indeed, as a third aspect of the disclosure, there is provided a multi-beam interferometer, comprising a multi-beam light source arranged to generate, in use, a plurality of beams of light from a single beam emitted from a light source, and in which the interferometer comprises a balance beam channel, comprising an optical path for a balance beam and a detector for the intensity of the balance beam in which, in use, the detected intensity of the balance beam is used to correct for laser amplitude variation, in which the balance beam has an intensity as high or higher than any other of the plurality of beams.

The intensity of the balance beam, in use, may be higher than the remaining beams of the plurality of beams. For example, it may be 5%, 10% or 25% higher than the most intense remaining beam.

Typically, the multi-beam interferometer is an Optical Coherence Tomography device.

BRIEF DESCRIPTION OF THE SEVERAL VIEWS OF THE DRAWINGS

There now follows, by way of example only, a description of an embodiment, described with reference to the accompanying drawings, in which:

FIG. 1 shows a plan view of a multi-beam source according to an embodiment;

FIG. 2 shows a front view of the rattle plate of FIG. 1, viewed from direction A;

DETAILED DESCRIPTION

Figure 3:
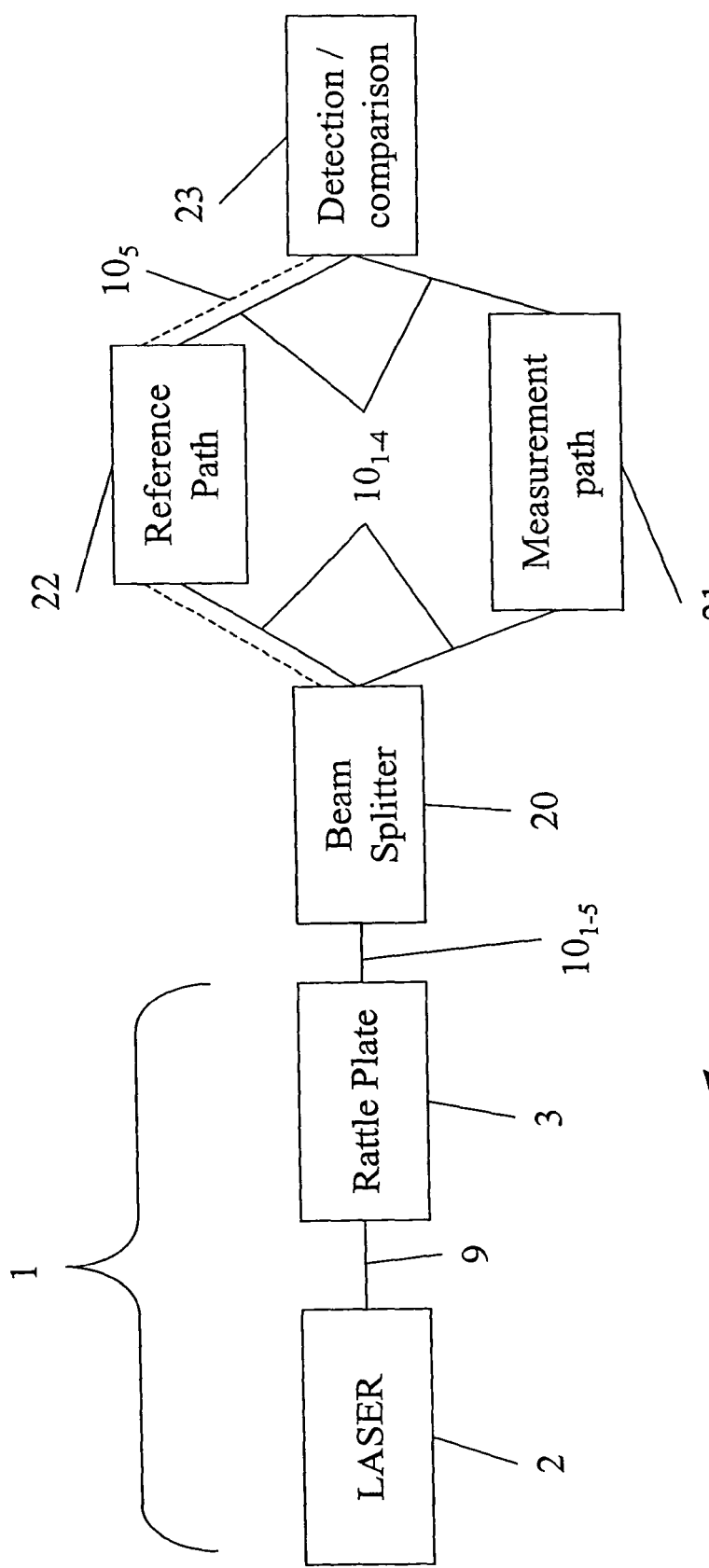
FIG. 3 shows a schematic view of the multi-beam source of FIG. 1 used in an Optical Coherence Tomography device.

A multi-beam source 1 for an Optical Coherence Tomography device can be seen in the accompanying drawings. This comprises a laser light source 2, which is arranged to emit an input beam of light 9. This is incident on a rattle plate 3, which splits the input beam 9 into five beams $10_{1\text{-}5}$.

The rattle plate 3 is a cubed piece of glass, having a first, input face 4 and a second, output face 5. In an embodiment, the input and output faces are parallel to within 30 arc seconds. Except in the region where the input beam 9 is incident thereon, the input face 4 is covered with a first reflective coating. In one embodiment, this has a level of reflectance of greater than 99% for internal reflections within the rattle plate at wavelengths of 1260 nm to 1360 nm, and greater than 70% for wavelengths of 500 to 700 nm. The output face has a second, partially reflective coating formed thereon, having, for example, a reflectance (internal to the rattle plate) of 25±3% in the wavelength range 1260 nm to 1360 nm and greater than 50% in the wavelength range 500 nm to 700 nm.

The second, partially reflective coating on the output face 5 of the rattle plate 3 is shaped as shown in FIG. 2 of the accompanying drawings. The coating is present over an area 6 of the output face 5 but absent from area 7, giving a transition 8 between the two areas. The area of the output face that is uncoated is substantially non-reflective and may be provided with an anti-reflection coating. Typical residual values of reflection internal to the rattle plate may, for example, be of the order of less than 0.5% if an anti-reflection coating were used.

In an embodiment, the rattle plate 3 is positioned relative to the light source 2 at an angle relative to the input beam 9 of 9.1° (±3°) to the perpendicular. Accordingly, as shown in FIG. 1, the input beam 9 is incident on the non-reflective portion of the input face 4, and is repeatedly reflected between the reflective coatings on the output 5 and input 4 faces, travelling through the rattle plate 3 as it does. Each reflection off the second, partially reflective coating causes a beam of light ($10_{1\text{-}4}$) to be emitted from the output face; these beams can then be used in the Optical Coherence Tomography device.

A terminal beam $10_5$, comprising the last beam emitted from the input beam 9, is not incident on the second reflective coating but is instead incident on the area 7 of the output face 5 with no reflective coating. Accordingly, no, or at least very little, of the input beam is reflected within the rattle plate and wasted. The vast majority of the energy in the input beam remaining after the fourth output beam $10_4$ is transmitted as the fifth and terminal beam $10_5$.

Accordingly, as compared with the prior art rattle plates discussed above where the partially reflective coating covers the entire output face, there is no need to provide an opaque plate to absorb unwanted beams, thus avoiding any problems stray beams of light might cause, and more efficient use may be made of the energy in the input beam.

It can be seen from FIG. 1 that the spacing D between the first $10_1$ and terminal output beams $10_5$ is defined by the thickness of the rattle plate 3 and the angle at which the rattle plate is inclined with respect to the input beam 9. Furthermore, it can be seen from both the Figures that the output beams 10 are in a plane, perpendicular to the page in FIG. 2 and so depicted by line 16.

In order that the correct number of output beams hit the reflectively coated area 6 on the output face 5, the rattle plate 3 is mounted on a mounting block 12 on a side face 11 of the rattle plate 3. The mounting is such that a variable number of shims 13 can be inserted in the mounting, so as to adjust the position of the rattle plate 3 along an axis 14 perpendicular to the side face 11. As shown in FIG. 2, the transition 8 between the coated 6 and non-coated 7 areas on the output 6 face is angled relative to this axis 14.

This means that, as the rattle plate 3 is moved relative to the mounting 12 and hence the light source 2 by the insertion or removal of shims 13, the position of the transition relative to the light beam 9 travelling through the rattle plate 3 changes. This will change the number of beams that hit the output face in the partially reflectively coated area 6 and so allow the rattle plate to be correctly aligned so as to emit the desired number of output beams. Of course, there will generally only be one terminal beam, as once the light beam 9 hits the uncoated area 7, substantially all of the remaining energy in the beam is transmitted as the terminal beam $10_5$.

FIG. 3 shows schematically the operation of the multi-beam source 1 in an Optical Coherence Tomography device 30. Further reference is made to WO2006/054116 where the general operation of an Optical Coherence Tomography device is more fully described. The light source 2 and rattle plate 3 operate as discussed above to generate a plurality of light beams $10_{1\text{-}5}$ at different focal depths within the target. Given a reflectance of 25% of the second reflective coating and 5 output beams, the percentage of the incident beam strengths of each of the output beams are 25%, 19%, 14%, 10% and 32% (the terminal beam $10_5$).

These beams are passed to a beam splitter 20, which splits each beam in two. The first four split beams $10_{1\text{-}4}$ are passed onto two different optical paths; the first, a measurement path 21 includes reflection off the bodily part it is desired to examine. The second optical path, the reference path 22, is of substantially the same length as the measurement path 21 and includes a reflection at the same optical distance as the bodily part. The two sets of split beams are recombined at detector/comparison unit 23 and the beams are allowed to interfere. Each of the recombined beams is detected in the detector/comparison unit 23 in a separate detector channel. From this, in the manner described in WO2006/054116, the structure of the bodily part can be detected.

The terminal beam $10_5$ is treated differently, as a balance beam. The part of the beam that is split and would otherwise travel through the measurement path is blocked at the beam splitter 20. The remainder of the beam $10_5$ is passed through the reference path and onto a dedicated detector at the detector/comparison unit 23. This detected signal is subtracted from each of the four measurement channels so as to counteract the effects of wide-band laser amplitude variation. When this has been subtracted, both the DC offset and the laser noise level in each channel should be reduced to near zero.

It can be seen that, at 32% of the incident beam, the balance beam/terminal beam $10_5$ is stronger than any other of the beams. Otherwise, the inherent uncorrelated noise contribution from the detector/preamplifier in the balance detector becomes more significant than that from the interferometer channels themselves.

In an alternative embodiment, not shown, the balance beam need not be the terminal beam, as long as it is one of the strongest beams. For example, if the reflectance of the second reflective coating is 70% and five beams are generated, then the relative intensities of the beams will be 30%, 21%, 15%, 10% and 24%. The first beam $10_1$ could then be used as the balance beam in place of the terminal beam $10_5$, which would be used as a standard measurement beam.

To the above-described embodiments of the device, those of ordinary skill in the art, in order to meet contingent needs, will be able to make modifications, adaptations, and replacements of elements with other functionally equivalent ones, without departing from the scope of the following claims. Each of the features described as belonging to a feasible embodiment can be implemented independently from the other embodiments described.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multi-beam interferometer comprising a multiple beam source, the multiple beam source configured to provide a plurality of beams of light for use in the interferometer, the multiple beam source comprising:
a light source configured to emit a beam of light; and
a rattle plate comprising a first reflective surface and a second reflective surface facing one another, the second reflective surface being only partially reflective;
in which the light source and the rattle plate are positioned relative to one another such that, in use, the beam of light is incident on the rattle plate such that the beam of light is repeatedly reflected along a beam path between the first and second reflective surfaces, each successive and spaced-apart reflection off the partially reflective second reflective surface causing a portion of the light beam to be transmitted through the second reflective surface to form one of the beams of the plurality of beams;
and in which between at least one successive pair of beams of the plurality of beams there is a decrease along the beam path in a level of reflectance of the second reflective surface.

2. The multi-beam interferometer of claim 1, in which the plurality of beams include a terminal beam, being the last of the plurality of beams to be emitted from the incident light beam as the incident light beam travels through the rattle plate, and in which one of the at least one successive pair of beams comprises the terminal beam.

3. The multi-beam interferometer of claim 2 in which the terminal beam is subject to substantially no reflection at the second reflective surface.

4. The multi-beam interferometer of claim 3 in which the second reflective surface is shaped and positioned such that, in use, the terminal beam is emitted from the rattle plate avoiding the second reflective surface.

5. The multi-beam interferometer of claim 1, in which the rattle plate comprises a transparent block having an input face and an output face and in which the first reflective surface is mounted on the input face and the second reflective surface is mounted on the output face.

6. The multi-beam interferometer of claim 5 in which the second reflective surface covers only a portion of the output face of the transparent block and in which the block is provided with an uncovered area of the output face of the block that is not covered with the second reflective surface.

7. The multi-beam interferometer of claim 6 in which the plurality of beams include a terminal beam, being the last of the plurality of beams to be emitted from the incident light beam as the incident light beam travels through the rattle plate, and in which one of the at least one successive pair of beams comprises the terminal beam and in which the uncovered area of the output face of the block provides an exit from the rattle plate for the terminal beam.

8. The multi-beam interferometer of claim 7 in which the first and second reflective surfaces comprise reflective coatings on the block and the uncovered area of the output face of the block comprises an uncoated area of the output face of the block.

9. The multi-beam interferometer of claim 5, in which the transparent block is mounted relative to the light source by means of a mounting attached to a side of the transparent block, the mounting being such that a position of the rattle plate relative to the light source can be adjusted so as to adjust a position that the beam of light is incident on the rattle plate so that the plurality of beams consists of a desired number of beams.

10. The multi-beam interferometer of claim 9 in which the second reflective surface covers only a portion of the output face of the transparent block and in which the block is provided with an uncovered area of the output face of the block that is not covered with the second reflective surface and in which the mounting is arranged such that, as it is adjusted, a transition between the second reflective surface and the uncovered area is moved relative to the plurality of beams.

11. The multi-beam interferometer of claim 10 in which the plurality of beams lies, in use, in a plane and the transition is positioned at a non-perpendicular, non-parallel angle to the plane of the beams in use.

12. The multi-beam interferometer of claim 11 in which the angle is 9.1 degrees, plus or minus 3 degrees.

13. The multi-beam interferometer of claim 9 in which the mounting is arranged such that the adjustment can be achieved by the insertion of spacers into the mounting, so as to move the rattle plate along an axis.

14. The multi-beam interferometer of claim 1, comprising a beam splitter, a reference path for the plurality of beams, a measurement path for the plurality of beams and means for comparing the plurality of beams as transmitted over the reference and measurement paths.

15. The multi-beam interferometer of claim 2, comprising a balance path, comprising an optical path for a balance beam being one of the plurality of beams and a detector for the intensity of the balance beam in which, in use, the detected intensity of the balance beam is used to correct for laser amplitude variation, in which the balance beam is the terminal beam, and where the reflectance of the second reflective coating and the number of beams in the plurality of beams is such that the balance beam, in use, has an intensity as high or higher than the remaining beams of the plurality of beams.

16. The multi-beam interferometer of claim 15 comprising a beam splitter, a reference path for the plurality of beams, a measurement path for the plurality of beams and means for comparing the plurality of beams as transmitted over the reference and measurement paths, in which the optical path for the balance beam comprises the reference path.

17. An Optical Coherence Tomography device, comprising:
a multiple beam source configured to provide a plurality of beams of light, the multiple beam source comprising:
a light source configured to emit a beam of light; and
a rattle plate comprising a first reflective surface and a second reflective surface facing one another, the second reflective surface being only partially reflective, wherein, the light source and the rattle plate are positioned relative to one another such that a beam of light incident on the rattle plate is repeatedly reflected along a beam path between the first and second reflective surfaces, each successive and spaced-apart reflection off the partially reflective second reflective surface causing a portion of the light beam to be transmitted through the second reflective surface to form one of the beams of the plurality of beams; and between at least one successive pair of beams of the plurality of beams there is a decrease along the beam path in a level of reflectance of the second reflective surface.

18. The Optical Coherence Tomography device of claim 17 wherein the plurality of beams include a terminal beam, being a last of the plurality of beams to be emitted from the incident light beam as the incident light beam travels through the rattle plate, and wherein one of the at least one successive pair of beams comprises the terminal beam.

19. The Optical Coherence Tomography device of claim 18 wherein the terminal beam is subject to substantially no reflection at the second reflective surface.

20. The Optical Coherence Tomography device of claim 19 wherein the second reflective surface is shaped and positioned such that the terminal beam is emitted from the rattle plate avoiding the second reflective surface.

* * * * *